(12) United States Patent
Chuang

(10) Patent No.: US 7,493,447 B2
(45) Date of Patent: Feb. 17, 2009

(54) SYSTEM AND METHOD FOR CACHING SEQUENTIAL PROGRAMS

(75) Inventor: Yi-Hsien Chuang, Hsinchu (TW)

(73) Assignee: Nuvoton Technology Corporation (TW)

( * ) Notice: Subject to any disclaimer, the term of this patent is extended or adjusted under 35 U.S.C. 154(b) by 176 days.

(21) Appl. No.: 11/381,404

(22) Filed: May 3, 2006

(65) Prior Publication Data

US 2007/0260810 A1    Nov. 8, 2007

(51) Int. Cl.
*G06F 12/00* (2006.01)

(52) U.S. Cl. .................. 711/125; 711/100; 711/102; 711/103; 711/113; 711/117; 711/118; 711/123; 711/126; 712/207; 712/216; 712/220; 712/223; 712/225; 712/232; 712/238; 712/239; 712/240

(58) Field of Classification Search .............. 711/100, 711/102–103, 113, 117–118, 123, 125–126; 712/207, 216, 220, 223, 225, 232, 238–240
See application file for complete search history.

(56) References Cited

U.S. PATENT DOCUMENTS

| 5,434,986 | A | * | 7/1995 | Kuslak et al. | ............... 712/216 |
| 5,473,764 | A | * | 12/1995 | Chi | ........................ 712/207 |
| 5,644,759 | A | * | 7/1997 | Lucas et al. | ............... 712/240 |
| 5,832,259 | A | * | 11/1998 | Stiles | ........................ 712/238 |
| 6,851,046 | B1 | * | 2/2005 | Delvaux et al. | ............. 712/236 |
| 2004/0172518 | A1 | * | 9/2004 | Saruwatari et al. | ........... 712/207 |

\* cited by examiner

*Primary Examiner*—Sanjiv Shah
*Assistant Examiner*—Zhuo H Li
(74) *Attorney, Agent, or Firm*—Fish & Richardson P.C.

(57) ABSTRACT

Methods and related computer program products, systems, and devices for using a NAND flash as a program ROM are disclosed.

14 Claims, 8 Drawing Sheets

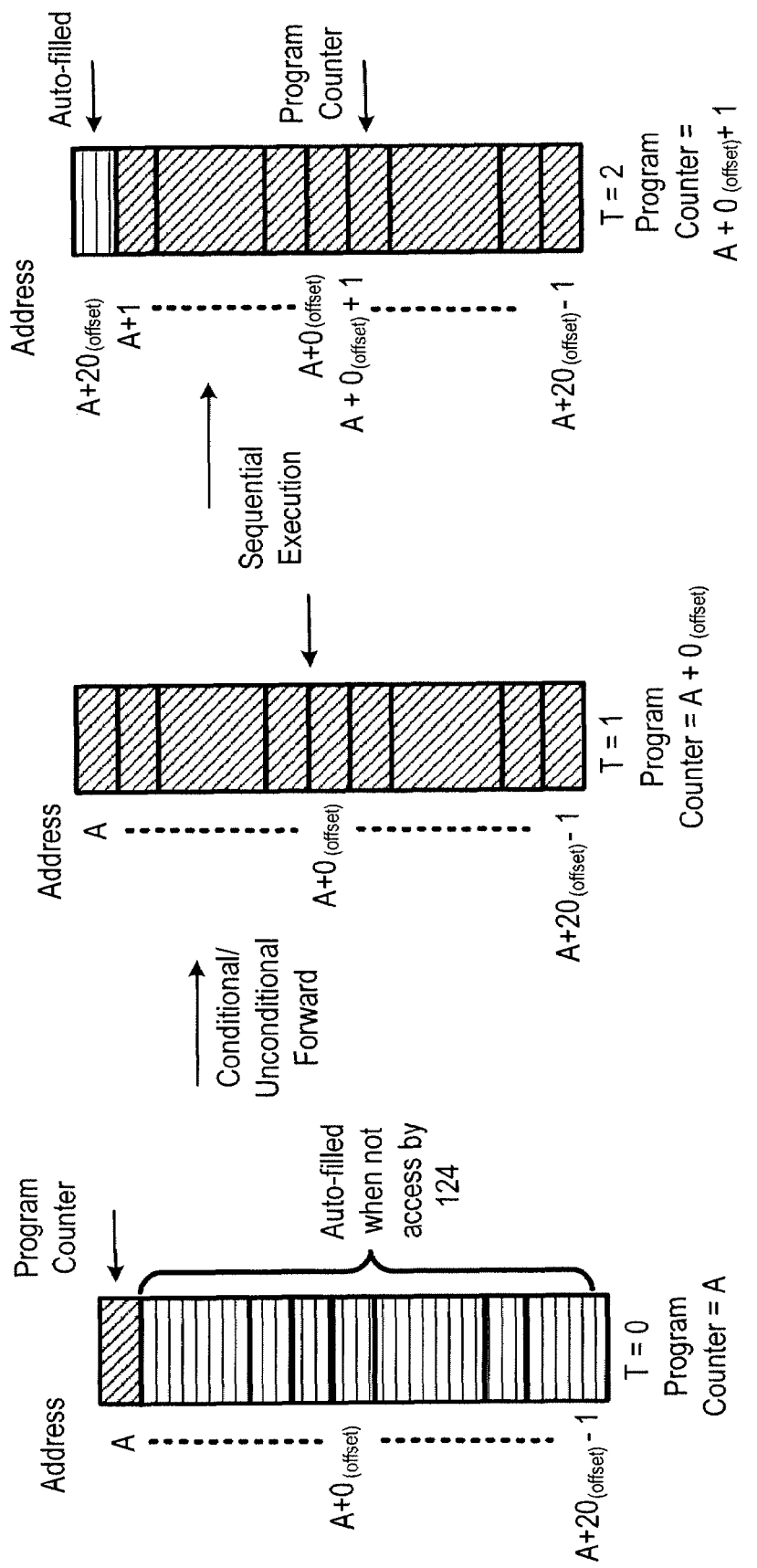

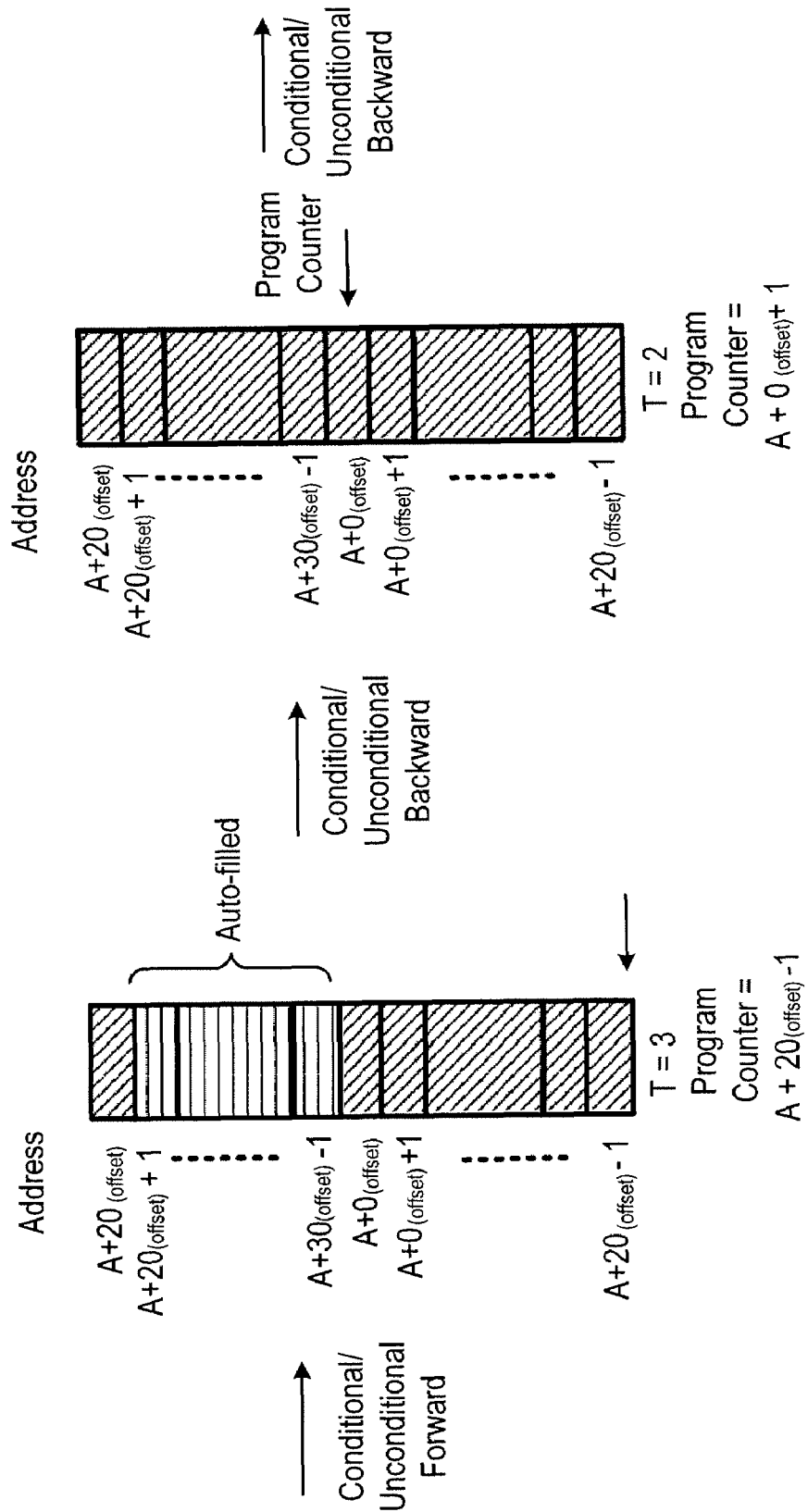

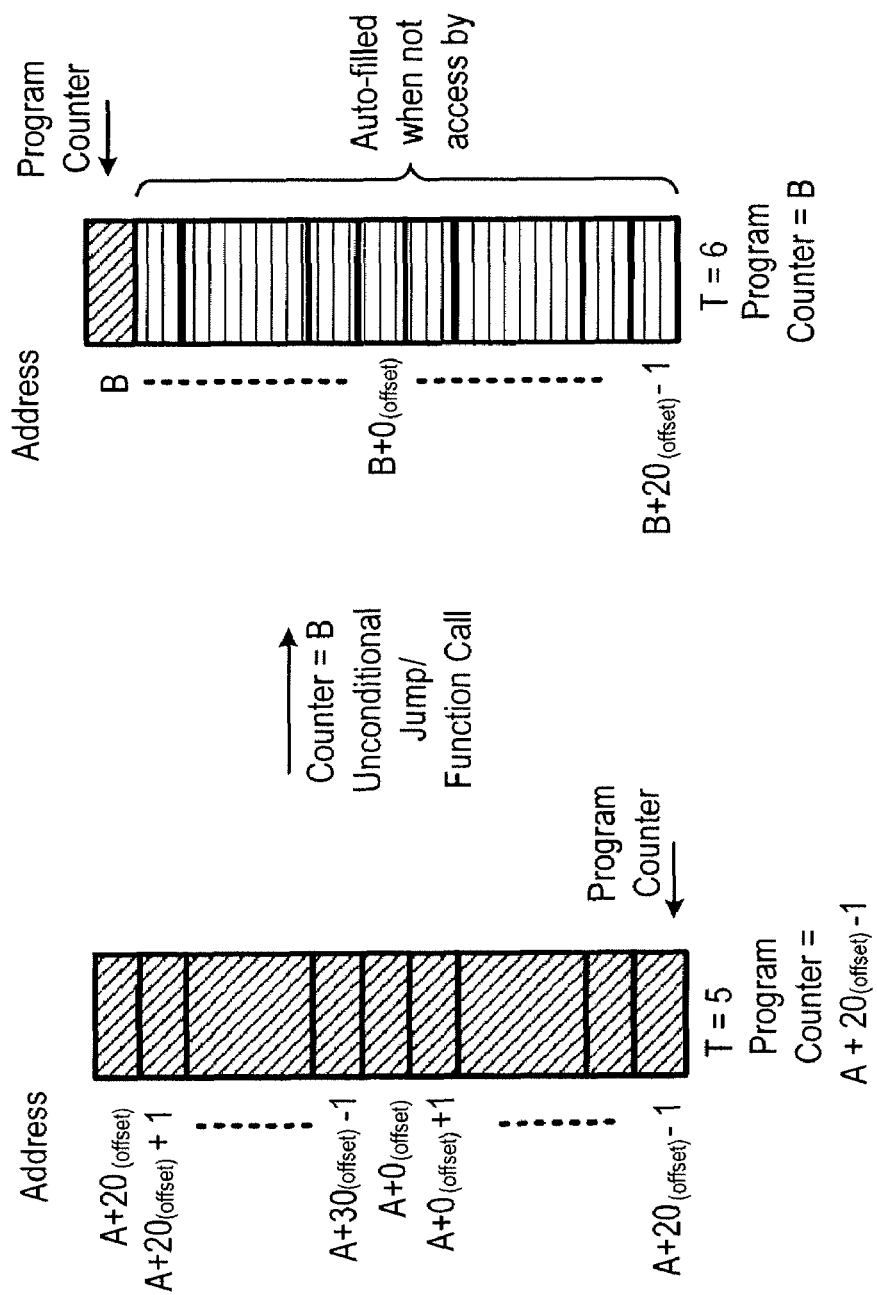

SYSTEM AND METHOD FOR CACHING SEQUENTIAL PROGRAMS

BACKGROUND

NAND flash memory has become a commonly used format for storing quantities of data on devices such as USB Flash drives, digital cameras and MP3 players. A NAND flash memory is a form of rewritable memory that derives its name from the resemblance to a NAND logic gate. NAND flash is often used for applications utilizing large files of sequential data because NAND flash provides higher density, lower cost, and faster write and erase times compared to other forms of memory such as NOR flash. NAND flash is generally fast to erase and write, but slow to read non-sequential data through its serial interface.

NAND flash memories are accessed much like block devices such as hard disks or memory cards. When executing software from NAND memories, their contents must first be paged into a memory-mapped random access memory (RAM) and executed in the RAM. This makes the presence of a memory management unit (MMU) in the system necessary. For example, when using NAND flash as program ROM, the system can include a large SRAM to store the program retrieved from the NAND flash. The program can then be executed in the SRAM.

SUMMARY

According to an aspect of the present invention, a system for executing a sequential program can include a NAND flash configured to store the sequential program and a processor configured to execute the sequential program. The system can also include a cache configured to store instructions received from the NAND flash. The cache can have a size of about twice the maximum offset of a conditional jump of the sequential program. The system can also include a cache controller configured to control the instructions stored in the cache.

Embodiments can include one or more of the following.

The cache can have a size between twice the maximum offset of a conditional jump and 2.2 times the maximum offset of a conditional jump. The cache can have a size equal to twice the maximum offset of a conditional jump. The cache controller can be configured to maintain a program counter that indicates the current location of execution of the sequential program by the processor. The cache controller can be further configured to maintain in the cache instructions with addresses within the range of the program counter minus the maximum offset of a conditional jump to the program counter plus the maximum offset of a conditional jump. The cache controller can be further configured to determine, in response to a jump command received from the processor, if a target address is stored in the cache; and if the target address is stored in the cache, change the program to the target address. The cache controller can be further configured to determine, in response to a jump command received from the processor, if the target address is not stored in the cache, clear the cache and send the target address to the NAND flash. The cache controller can be further configured to sequentially fetch additional instructions from the NAND flash if the jump command is a forward jump command and the address is stored in the cache. The cache can be a SRAM device.

According to an aspect of the present invention, a cache management unit can include a first interface configured to receive a sequential program from a NAND flash and send instructions to the NAND flash and a second interface configured to send and receive data from a processor configured to execute the sequential program. The cache management unit can also include a cache configured to store instructions received from the NAND flash The cache can have a size of about twice the maximum offset of a conditional jump of the sequential program. The cache controller can be configured to control the instructions stored in the cache.

Embodiments can include one or more of the following.

The cache can have a size between twice the maximum offset of a conditional jump and 2.2 times the maximum offset of a conditional jump. The cache can have a size equal to twice the maximum offset of a conditional jump. The cache controller can be configured to maintain a program counter that indicates the current location of execution of the sequential program by the processor. The cache controller can be further configured to maintain in the cache instructions with addresses within the range of the program counter minus the maximum offset of a conditional jump to the program counter plus the maximum offset of a conditional jump. The cache controller can be further configured to determine, in response to a jump command received from the processor, if a target address is stored in the cache; and if the target address is stored in the cache, change the program to the target address. The cache controller can be further configured to determine, in response to a jump command received from the processor, if the target address is not stored in the cache, clear the cache and send the target address to the NAND flash. The cache controller can be further configured to sequentially fetch additional instructions from the NAND flash if the jump command is a forward jump command and the address is stored in the cache. The cache can be a SRAM device.

In some embodiments, a RAM, e.g., an SRAM, is sized and configured to store data ranging from the $PC+O_{(offset)}$ to $PC-O_{(offset)}$ where $O_{(offset)}$ is the absolute offset of a conditional or unconditional jump. Storing addresses in the range of $PC+O_{(offset)}$ to $PC-O_{(offset)}$ can reduce the waiting time when a jump command is issued because the target address is already stored in the SRAM. Therefore, it is not necessary to send a new address to the NAND flash.

In some embodiments, using a state machine to control access to the NAND flash can reduce the waiting time.

In some embodiments, a cache controller provides methods to retrieve information from a NAND flash based on the contents of the cache. The cache controller maintains data in the cache to minimize the likelihood that a new address will need to be sent to the NAND.

In some embodiments, a cache controller allows NAND flash to be used as program ROM without a large SRAM and without an embedded controller.

The details of one or more embodiments of the invention are set forth in the accompanying drawings and the description below.

DESCRIPTION OF DRAWINGS

FIGS. 6A-6G are block diagrams of an exemplary use of the cache to store information from the NAND.

DETAILED DESCRIPTION

Figure 1:
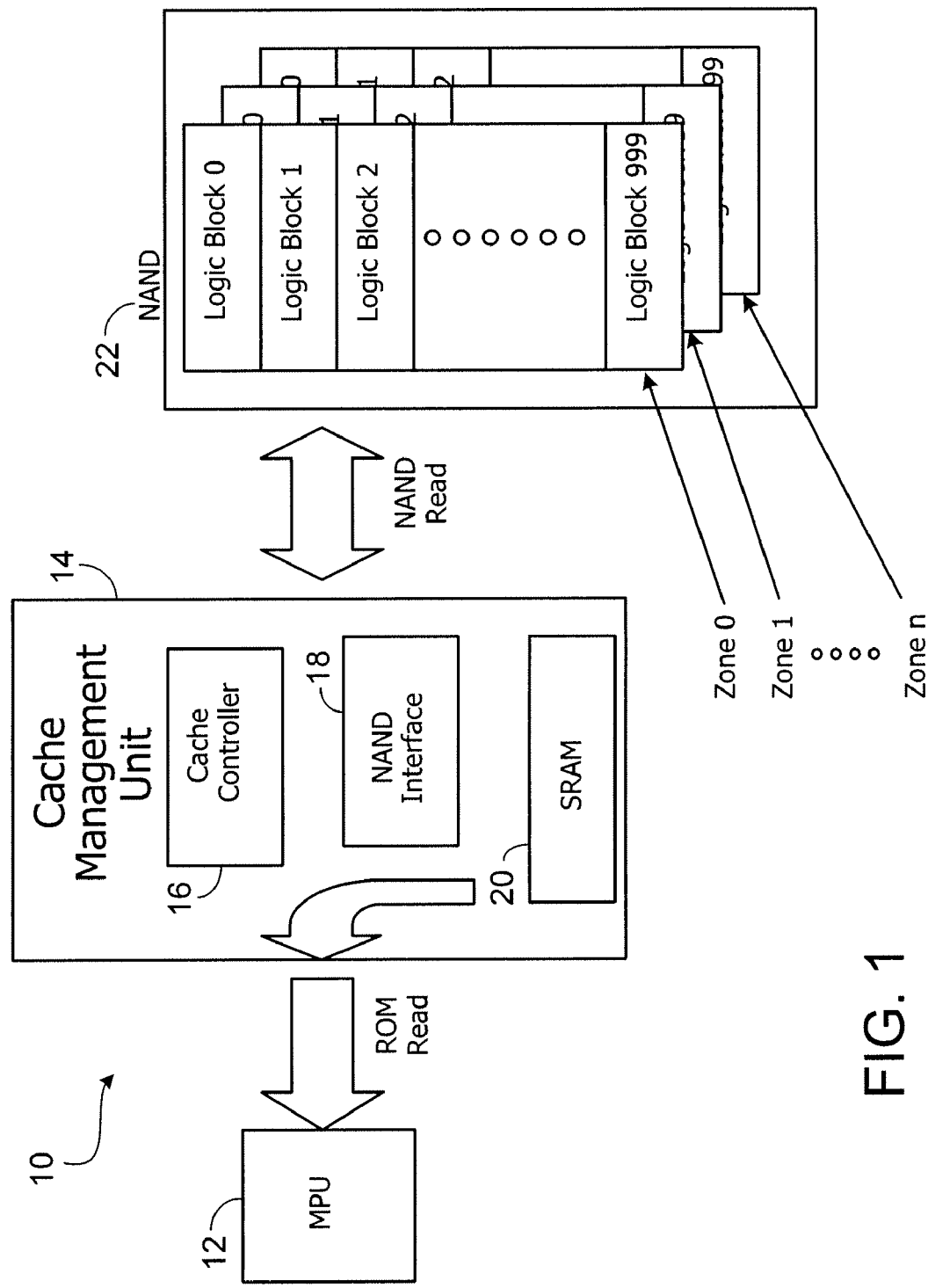
FIG. 1 is a block diagram of a memory access system.

Referring first to FIG. 1, a system 10 includes a NAND flash 22 as program ROM is 20 shown. System 10 also includes a microprocessor unit 12 (MPU) and a cache management unit 14.

In general, the MPU 12 interprets and executes instructions contained in software. The software executed by the MPU 12 is stored in the NAND flash 22. However, the MPU 12 does not access the NAND flash 22 directly. Instead, the MPU 12 accesses the NAND flash 22 and the programs stored therein using the cache management unit 14.

The cache management unit 14 includes a cache controller 16, a NAND interface 18, and an SRAM 20. The cache controller 16 controls and manages the content stored in the SRAM 20 by controlling what programs are fetched from NAND flash 22 and caching the desired programs in the SRAM 20. The cache controller 16 reads programs from the NAND flash 22 and stores the programs in the SRAM 20. The MPU 12 can access the programs stored therein. The NAND interface 18 provides a communication path between the cache management unit 14 and the NAND flash 22. The cache management unit 14 uses the NAND interface 18 to receive programs from the NAND flash 22 and to send addresses and instructions to the NAND flash 22. The NAND interface 18 includes a single data line which is used for both transmitting addresses from the cache controller 16 to the NAND flash 22 and for receiving data from the NAND flash 22. Since the NAND interface 18 includes a single communication line (as opposed to separate address and data lines) access to the NAND flash 22 is performed in two steps. First, the address is sent from the cache controller 16 to the NAND flash 22. Second, in response to the received address, the NAND flash 22 sends the requested data to the cache management until 14 via the NAND interface 18.

In some embodiments, the NAND flash 22 stores sequential programs and the SRAM 20 caches the sequential programs for execution by the MPU 12. A sequential program is a program that includes instructions that are executed in a sequential manner. When the NAND flash 22 stores a sequential program, the program is fetched in a sequential manner and, once an initial address is received by the NAND flash 22 from the cache controller 16, the NAND flash 22 sends data stored in subsequent memory locations of the NAND flash 22 to the cache management unit 14 in a sequential manner (e.g., A, A+1, A+2, A+3, A+4 . . . A+n). During execution of the sequential program by the MPU 12, a conditional or unconditional jump may occur. A conditional jump is an instruction to jump to a target address and begin executing the program at the target address if a particular condition is met. An unconditional jump is an instruction to jump to a target address regardless of any conditions. The absolute offset of a conditional jump of the MPU 12 is represented herein by the variable "$O_{(offset)}$."

Figure 2:
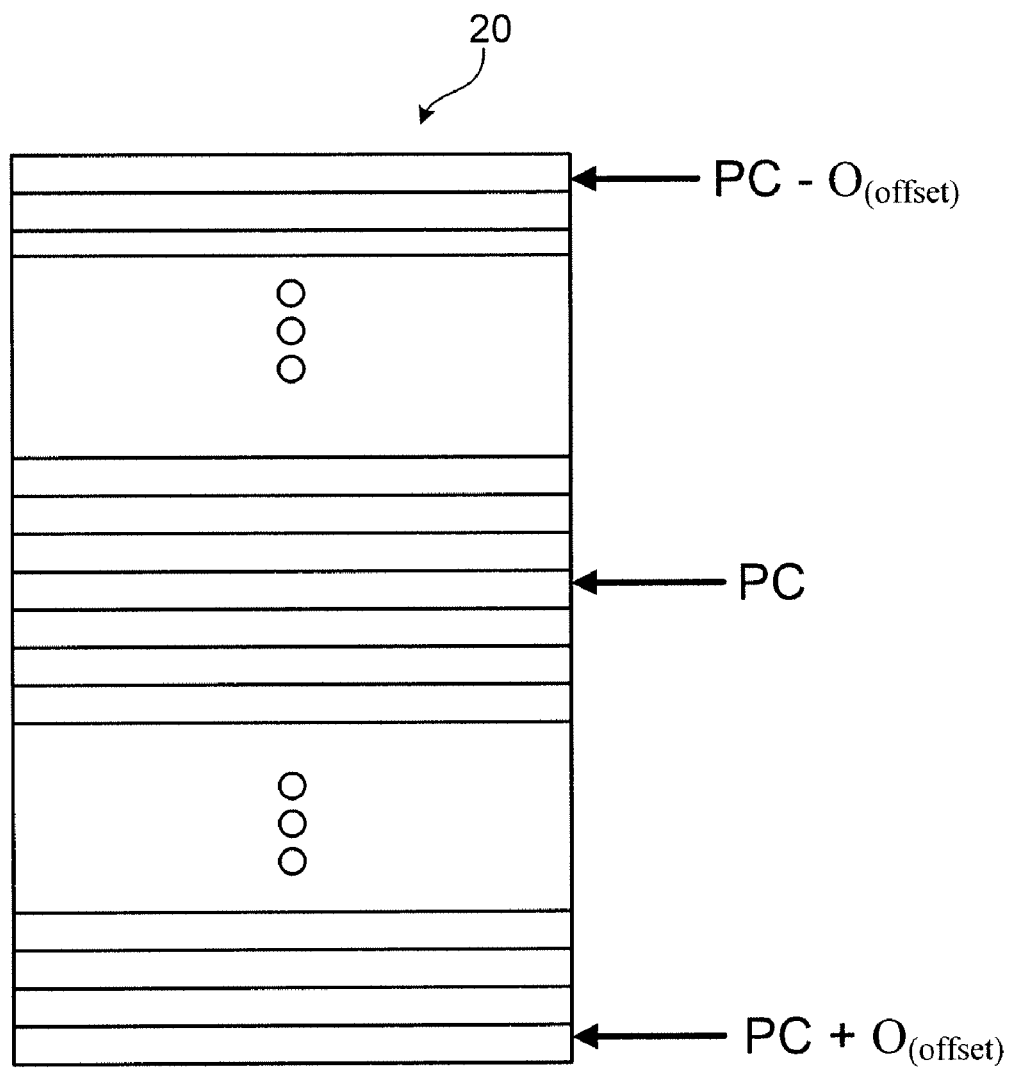
FIG. 2 is a block diagram of a cache.

Referring to FIG. 2, an exemplary block diagram of the memory locations of SRAM 20 is shown. The SRAM 20 is configured to have a minimum size of twice the absolute offset of a conditional jump (e.g., $2*O_{(offset)}$). In general, the size of the absolute offset is between about 128 and about 32768 resulting in a cache size of about 256 to about 65536 for the SRAM. Having a cache with minimum size of $2*O_{(offset)}$ allows the MPU 12 to jump forward or backward by the absolute offset of a conditional jump "$O_{(offset)}$" without requiring the cache controller 16 to send a new address to the NAND flash 22. A new address is not necessary because the SRAM 20 stores instructions from the current value of the program counter minus the offset (i.e., PC-$O_{(offset)}$) to the current value of the program counter plus the offset (i.e., PC+$O_{(offset)}$) and thus can accommodate the jump. Storing this set of instructions in the SRAM 20 can provide the benefit of reducing the delay time when a conditional or unconditional jump is encountered by eliminating the delay associated with sending a new address and receiving data from the NAND flash 22.

The cache controller 16 uses the SRAM 20 as a circular buffer with the current location within the buffer indicated by a program counter (PC). The cache controller 16 includes a state machine that controls the content of the SRAM 20. The content of the SRAM 20 will vary depending on the conditions received by the cache controller 16 from the MPU 12 during execution of the sequential program (as described below).

In general, the cache controller 16 automatically fetches data from the NAND flash 22 during time periods when the SRAM 20 is not being accessed by the MPU 12. The cache controller 16 continues to sequentially fetch data sequentially from the NAND flash 22 until the SRAM 20 is full. When the SRAM 20 is full, the cache controller 16 waits to fetch additional data from the NAND flash 22 until MPU 12 has accessed some of the data in the SRAM 20 such that a portion of the data in the SRAM 20 that is no longer within the range of plus or minus the $O_{(offset)}$ from the PC can be overwritten.

During execution of the program, MPU 12 can cross pages or blocks. A block is the basic unit for erase in NAND flash 22 is block and a page is the basic unit for read/write in NAND flash 22. One block contains, for example, 32 pages or 64 pages. All pages in the same block have the same block address. When the MPU 12 crosses to a new page having the same block address as the previous page, there is no need to search out new block address. During execution of the program, when the MPU 12 crosses pages, the cache controller 16 automatically generates a read command and sends the address to the NAND flash 22 for reading the new page. If crossing blocks (for example, in a block containing 32 pages, crossing blocks means moving from page 31 in the current block to page 0 in another block), the new block address must be determined. Thus, when the MPU 12 crosses blocks, the cache controller 16 does not fetch new data from the NAND flash 22. Instead, the cache controller 16 generates a read fault signal.

As described above, the NAND flash 22 stores a sequential program. When the MPU 12 executes the sequential program, the data needed to be retrieved from the NAND flash 22 and stored in the SRAM 20 is generally sequential nature. Thus, during sequential execution of the program by the MPU 12, the cache controller 16 attempts to keep addresses PC-$O_{(offset)}$ to PC+$O_{(offset)}$ in SRAM 20 (i.e., the data stored at the current program counter and the data within the offset $O_{(offset)}$ of the program counter). The actual addresses stored in SRAM 20 at any particular time vary somewhat from the desired range of PC-$O_{(offset)}$ to PC+$O_{(offset)}$ due to the timing needed to access the SRAM 20 and to access the NAND flash 22. For example, the cache controller 16 retrieves data from the NAND flash 22 when the SRAM 20 is not being read by the MPU 12. This may result in a delay between the time when the instructions located at PC are read and when the instructions located at PC-$O_{(offset)}$ are overwritten with new data from the NAND flash 22. However, during sequential execution the cache controller 16 attempts to maintain the addresses from PC-$O_{(offset)}$ to PC+$O_{(offset)}$ in the SRAM 20 as nearly as possible.

During the execution of the sequential program, the MPU 12 may encounter various types of instructions groups such as conditional jumps and unconditional jumps. When the MPU 12 encounters a conditional or unconditional jump, the cache controller 16 attempts to complete the jump without sending a new address to the NAND flash 22 as described below in relation to FIGS. 3-5.

Figure 3:
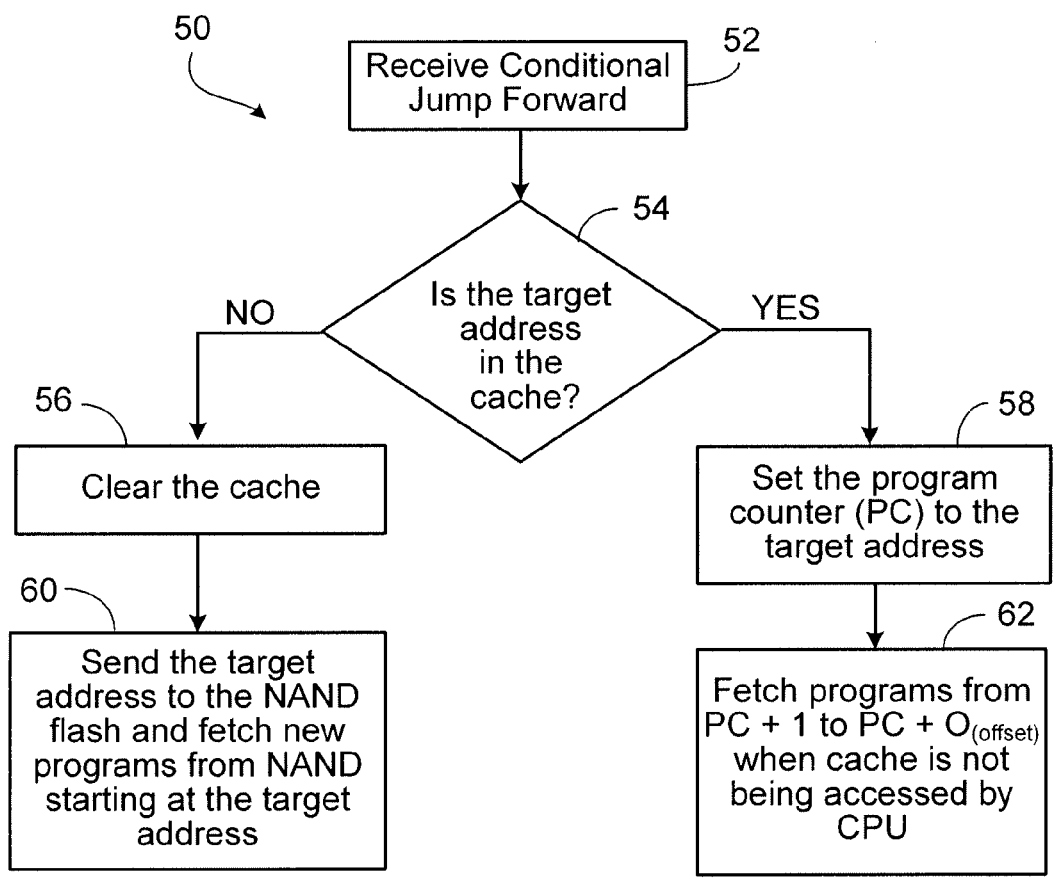
FIG. 3 is a flow chart of a conditional forward jump process.

Referring to FIG. 3, a process 50 for managing the information retrieved by the cache controller 16 from the NAND flash 22 when a conditional forward jump is encountered is shown. A conditional jump forward is encountered when the instruction executed by the MPU 12 depends on a condition. If the condition is not met, then the MPU 12 continues to execute the program sequentially. If the condition is met, then the program jumps to an instruction located at an address subsequent to the currently executing address (referred to as the target address). The maximum offset of the conditional jump forward is indicated as "+$O_{(offset)}$."

When the MPU 12 receives (52) a conditional jump forward and the condition is met, the cache controller 16 determines (54) if the target address for the conditional jump forward is in the SRAM 20. If the target address is not in the SRAM 20, then the cache controller 16 clears (56) the SRAM 20 and sends 60 the target address to the NAND flash 22 to fetch new programs starting at the target address. If the target address is in the SRAM 20, then it is not necessary to send the target address to the NAND flash 22. Rather, the cache controller 16 sets (58) the program counter (PC) to the target address. The cache controller 16 also retrieves programs from PC+1 to PC+$O_{(offset)}$ when the SRAM 20 is not being accessed by MPU 12. Since the NAND flash 22 to continues to send the data to the SRAM 20 sequentially when the target address for a conditional jump forward is in the SRAM 20 and no new address is sent to the NAND flash 22, the delay time of sending a new address to the NAND flash 22 during a conditional jump forward is eliminated.

Figure 4:
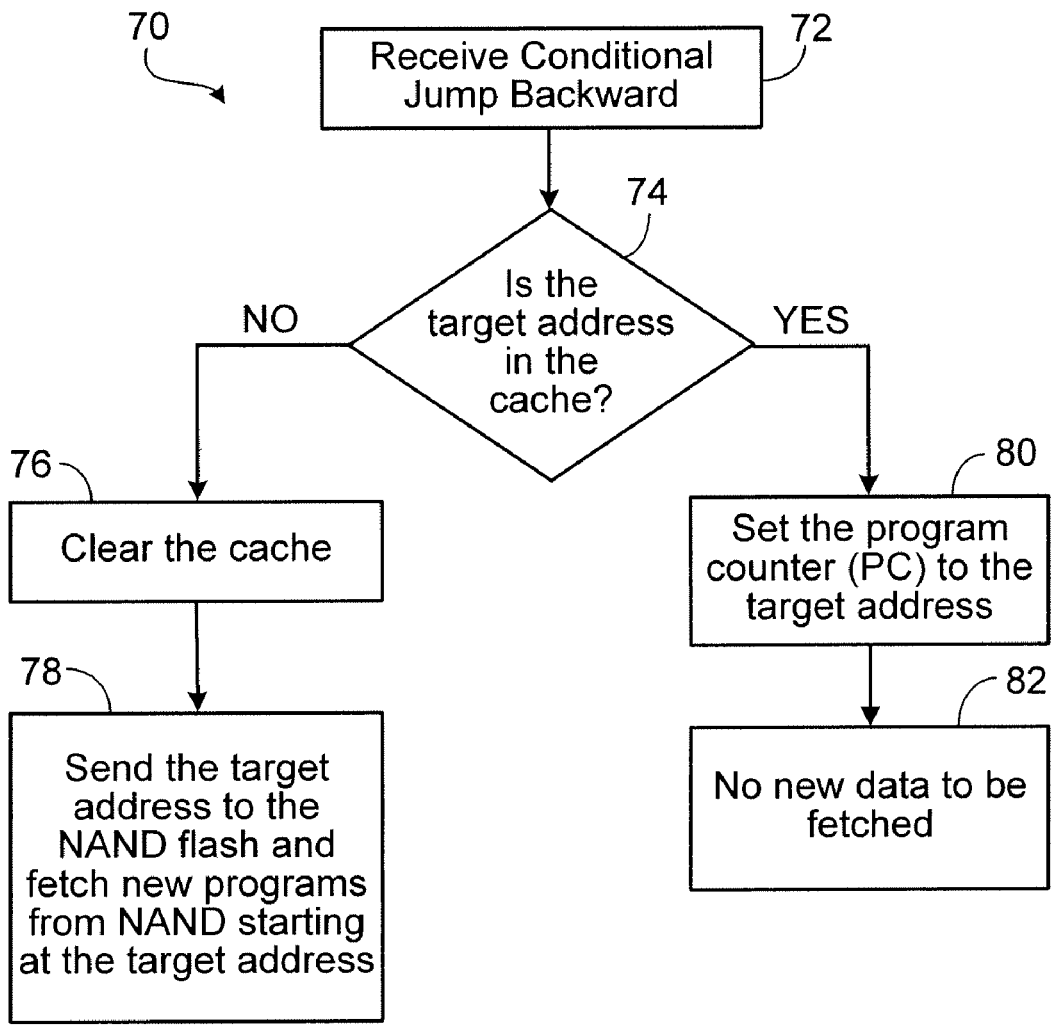
FIG. 4 is a flow chart of a conditional backward jump process.

Referring to FIG. 4, a process 70 for managing the information retrieved by the cache controller 16 from the NAND flash 22 when a conditional jump backward is encountered is shown. A conditional jump backward is encountered when the instruction executed by the MPU 12 depends on a condition. If the condition is not met, then the MPU 12 continues to execute the program sequentially. If the condition is met, then the program jumps to an instruction located at an address prior to the currently executing address (referred to as the target address). The maximum offset of the conditional jump backward is indicated as "−$O_{(offset)}$."

When the MPU 12 receives (72) a conditional jump backward and the condition is met, the cache controller 16 determines (74) if the target address for the conditional jump backward is in the SRAM 20. If the target address is not in the SRAM 20, then the cache controller 16 clears (76) the SRAM 20 and sends (78) the target address to the NAND flash 22 to fetch new programs starting at the target address. If the target address is in the SRAM 20, then it is not necessary to send the target address to the NAND flash 22. Rather, the cache controller 16 sets (80) the program counter (PC) to the target address. The cache controller does not fetch new data from the NAND flash 22 because the programs at the requested target address are already stored in the cache and therefore, no new data is fetched from the NAND flash 22 (82). More particularly, the cache controller 16 does not immediately retrieve any additional data from the NAND flash 22 because the cache controller attempts to maintain addresses PC−$O_{(offset)}$ to PC+$O_{(offset)}$ in the SRAM 20. Therefore, until a portion of the instructions currently stored in the SRAM 20 are executed, no new data needs to be retrieved. Since the NAND flash 22 simply delays sending additional data to the SRAM 20 (but the data is still sent sequentially) when the target address for a conditional jump backward is in the SRAM 20, the delay time of sending a new address to the NAND flash 22 during a conditional jump backward is eliminated.

Figure 5:
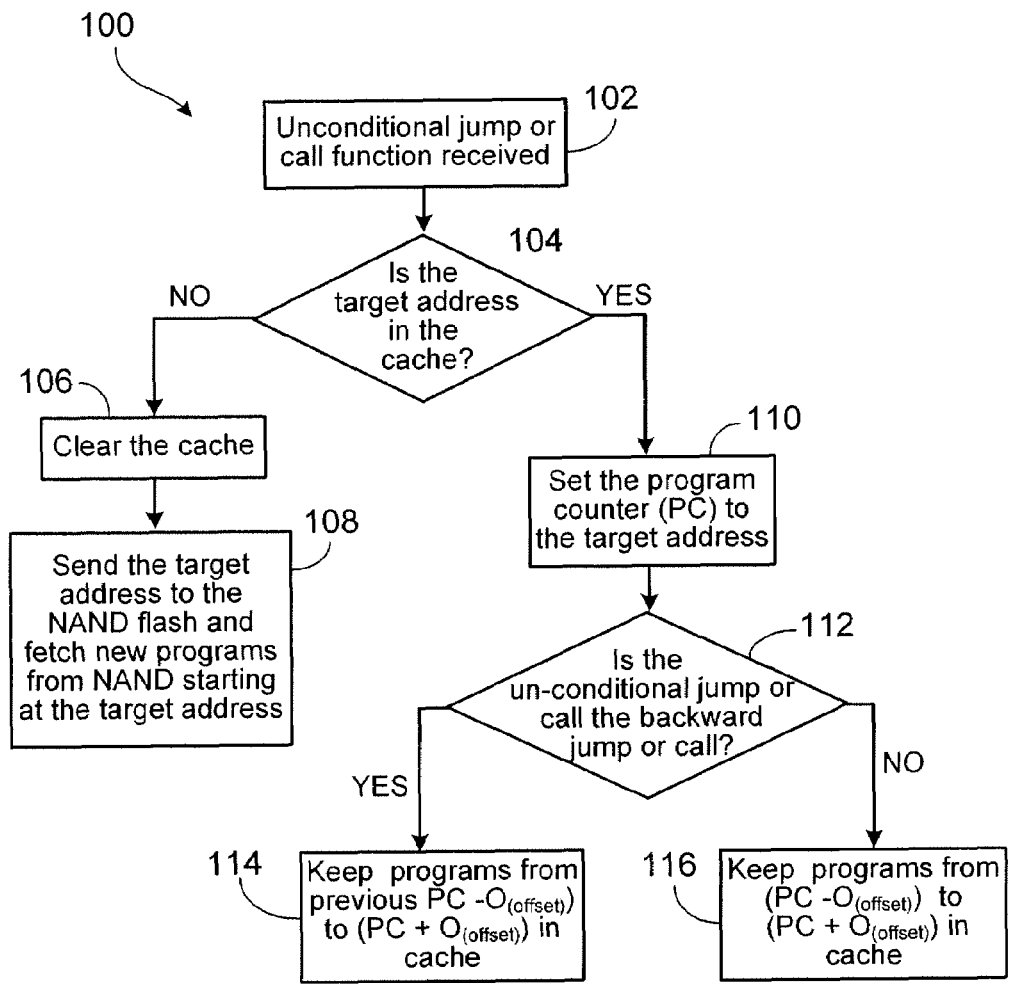
FIG. 5 is a flow chart of an unconditional jump process.

Referring to FIG. 5, a process 100 for managing the information retrieved by the cache controller 16 from the NAND flash 22 when an unconditional jump or a call function is encountered. An unconditional jump is encountered when the instruction executed by the MPU 12 instructs the MPU 12 to begin executing at a different location within the program (referred to as the target address). When the MPU 12 receives (102) an unconditional jump, the cache controller 16 determines (104) if the target address for the jump is in the SRAM 20. If the target address is not in the SRAM 20, then the cache controller 16 clears (106) the SRAM 20 and sends (108) the target address to the NAND flash 22 to fetch new programs starting at the target address. If the target address is in the SRAM 20, then it is not necessary to send the target address to the NAND flash 22. Rather, the cache controller 16 sets (110) the program counter (PC) to the target address. The cache controller 16 then determines if the unconditional jump or call is a backward jump or call (112). If the unconditional jump or call is not a backward jump or call (e.g., it is a forward jump or call), the cache controller 16 maintains addresses from PC−$O_{(offset)}$ to PC+$O_{(offset)}$ in the SRAM 20 (116). If the offset of the jump is forward, this may require sequentially fetching additional instructions from NAND flash 22. If the offset of the jump is backward, this may require delaying receiving additional instructions from the NAND flash 22. In this case, the cache keeps programs from the previous PC−$O_{(offset)}$ to PC+$O_{(offset)}$ in the SRAM 20 (114).

As described above the cache controller 16 generally attempts to maintain, as nearly as possible, the addresses from the current address of the program counter minus the offset (i.e., PC−$O_{(offset)}$) to the current address of the program counter plus the offset (i.e., PC+$O_{(offset)}$). Keeping the addresses from PC−$O_{(offset)}$ to PC+$O_{(offset)}$ in SRAM 20 reduces the waiting time encountered when a jump is encountered by eliminating the need to send a new address to the NAND flash 22. FIGS. 6A-6G provide an example of how the cache controller 16 responds to various conditions during the execution of a sequential program stored in SRAM 20 based on the processes described above. In FIGS. 6A-6G, the time as indicated by T=x does not necessarily represent a single time step or cycle of the MPU 12.

Referring to FIG. 6A, prior to time T=0 the SRAM 20 is empty. In order to fill the SRAM 20, at time T=0, the cache controller 16 sends an address "A" to the NAND flash 22. In response, the NAND flash 22 will begin to send the instruction(s) at address A and the instructions will be stored in the SRAM 20 (as indicated by block 122). The program counter (PC) is set to the address requested, namely address A, as indicated by arrow 120. Since the NAND flash 22 stores a sequential program, it is not necessary to send a new address to the NAND flash 22 in order to fill the SRAM 20 with additional portions of the sequential program. The cache controller 16 fills the remainder of the SRAM 20 when the SRAM 20 is not being accessed by the MPU 12. Since the MPU 12 executes the instructions at a speed slower than the speed at which the NAND flash 22 fetches the instructions and stores the instructions in SRAM 20, the SRAM 20 will be filled with sequential portions of the program at addresses A+1 to A+2 $O_{(offset)}$−1 as indicated by portion 124. The absolute offset of a conditional jump is represented by the variable "$O_{(offset)}$"

The actual offset of any particular conditional jump can be any value smaller than $O_{(offset)}$.

Referring to FIG. 6B, at time T=1, the MPU 12 has executed the instructions at addresses A to $A+O_{(offset)}$. Since the MPU 12 has executed the instructions located at A to $A+O_{(offset)}$, the program counter is set to $A+O_{(offset)}$ as shown by arrow 130. Thus, at time T=1, the cache stores instructions from $PC-O_{(offset)}$ to $PC+O_{(offset)}$ (e.g., A to $A+2O_{(offset)}-1$).

Referring to FIG. 6C, when the time increments from T=1 to T=2, the MPU 12 has executed the instruction at address $A+O_{(offset)}$ and the program counter is incremented from $A+O_{(offset)}$ to $A+O_{(offset)}+1$ as indicated by arrow 132. When the program counter is incremented to $A+O_{(offset)}+1$, the cache controller attempts to maintain addresses from $PC-O_{(offset)}$ to $PC+O_{(offset)}$ in the SRAM 20. Therefore, the cache controller 16 overwrites the cache location which had been filled with address A at time T=1 with address $A+2O_{(offset)}$. Thus, at time T=2, the program counter is located at $A+O_{(offset)}+1$ and addresses A+1 to $A+2 O_{(offset)}$ are stored in SRAM 20.

Referring to FIG. 6D, between time T=2 and T=3 a conditional jump forward in which the condition was met or an unconditional jump forward has occurred with a target address of $A+2O_{(offset)}-1$. Since the address $A+2O_{(offset)}-1$ is currently stored in the SRAM 20, the cache controller does not have to send a new address to the NAND flash 22. The cache controller 16 changes the program counter to the target address, namely $A+2O_{(offset)}-1$, as indicated by arrow 134. Since a forward jump has occurred, a portion of the cache 136 is overwritten in order to keep addresses in the range of $PC-O_{(offset)}$ to $PC+O_{(offset)}$ in the SRAM 20 (since the program counter is $A+2O_{(offset)}-1$ the cache controller attempts to supply the range of $A+O_{(offset)}$ to $A+3O_{(offset)}-1$ in SRAM 20). In particular, in order to keep the desired range of addresses in the SRAM 20, the cache controller 16 overwrites a portion 136 of the SRAM 20 that previously contained addresses A+1 to $A+_{(offset)}$ with addresses in the range from $A+2O_{(offset)}+1$ to $A+3O_{(offset)}-1$.

Referring to FIG. 6E, at time T=4 a conditional jump backward in which the condition was met or an unconditional jump backward has occurred with a target address of $A+O_{(offset)}$. Since the address $A+O_{(offset)}$ is currently stored in the SRAM 20, the cache controller does not have to send a new address to the NAND flash 22. In order to complete the jump, the cache controller simply changes the program counter from $A+2O_{(offset)}-1$ (i.e., the program counter at time T=3) to the target address $A+O_{(offset)}$. When the program counter is changed to $A+O_{(offset)}$, the addresses from $A+O_{(offset)\,t}$ to $A+3O_{(offset)}-1$ will remain in the SRAM 20. Thus, there will be a period of time during which the SRAM 20 stores instructions from PC to $PC+2O_{(offset)}$ rather than $PC-_{(offset)}$ to $PC+O_{(offset)}$ as desired. As shown in FIG. 6F, since the SRAM 20 includes the range of PC to $PC+2O_{(offset)}$ at time T=4, no new data will be received from the NAND flash 22 and stored in the SRAM 20 until the program counter is incremented from $A+O_{(offset)}$ to $A+2O_{(offset)}-1$ such that the range of $PC-O_{(offset)}$ to $PC+O_{(offset)}$ is once again stored in SRAM 20 (e.g., $A+O_{(offset)}$ to $A+3O_{(offset)}-1$ since the program counter is $A+2O_{(offset)}-1$).

Referring to FIG. 6G, at time T=6 a conditional or unconditional jump in which the address was not in the SRAM 20 has occurred. Since the target address "B" is not in the SRAM 20. In order to fill the SRAM 20, at time T=6, the cache controller 16 sends the target address "B" to the NAND flash 22. In response, the NAND flash 22 will begin to send the instruction(s) at address B and the instructions will be stored in the SRAM 20. The program counter (PC) is set to the address requested, namely address B and the cache controller 16 fills the remainder of the SRAM 20 with addressed B+1 to $B+2O_{(offset)}-1$ when the SRAM 20 is not being accessed by the MPU 12.

Other embodiments are within the scope of the following claims:

What is claimed is:

1. A system for executing a sequential program, the system comprising:
    a NAND flash configured to store the sequential program;
    a processor configured to execute the sequential program;
    a cache configured to store instructions received from the NAND flash, the cache having a size related to the maximum offset of a conditional jump of the sequential program, the size being at least twice the maximum offset of a conditional jump of the sequential program;
    a cache controller configured to control the instructions stored in the cache, wherein the cache controller is further configured to maintain in the cache instructions with addresses within the range of the program counter minus the maximum offset of a conditional jump to the program counter plus the maximum offset of a conditional jump;
    wherein the cache controller is configured to determine, in response to a jump command received from the processor, if a target address is stored in the cache; and
    the cache controller is configured to delay fetching additional instructions from the NAND flash if the jump command is a backward jump command and the address is stored in the cache.

2. The system of claim 1, wherein the cache has a size between twice the maximum offset of a conditional jump and 2.2 times the maximum offset of a conditional jump.

3. The system of claim 1, wherein the cache has a size equal to twice the maximum offset of a conditional jump.

4. The system of claim 1, wherein the cache controller is configured to maintain a program counter that indicates the current location of execution of the sequential program by the processor.

5. The system of claim 1, wherein the cache controller is configured to:
    determine, in response to the jump command received from the processor, if the target address is stored in the cache; and
    if the target address is stored in the cache, change the program to the target address; and
    if the target address is not stored in the cache, clear the cache and send the target address to the NAND flash.

6. The system of claim 5, wherein the cache controller is further configured to sequentially fetch additional instructions from the NAND flash if the jump command is a forward jump command and the address is stored in the cache.

7. The system of claim 1, wherein the cache is a SRAM device.

8. A cache management unit comprising:
    a first interface configured to receive a sequential program from a NAND flash and send instructions to the NAND flash;
    a second interface configured to send and receive data from a processor configured to execute the sequential program;
    a cache configured to store instructions received from the NAND flash, the cache having a size related to the maximum offset of a conditional jump of the sequential program, the size being at least twice the maximum offset of a conditional jump of the sequential program;
    a cache controller configured to control the instructions stored in the cache, wherein the cache controller is further configured to maintain in the cache instructions with addresses within the range of the program counter minus the maximum offset of a conditional jump to the program counter plus the maximum offset of a conditional jump;

wherein the cache controller is configured to determine, in response to a jump command received from the processor, if a target address is stored in the cache; and the cache controller is configured to delay fetching additional instructions from the NAND flash if the jump command is a backward jump command and the address is stored in the cache.

9. A method comprising:

receiving a portion of a sequential program from a NAND flash;

storing the received portion of the sequential program received from the NAND flash in a cache;

maintaining a program counter (PC) that indicates the current location of execution of the sequential program;

wherein storing the received portion of the sequential program comprises storing instructions with addresses within the range of the program counter minus a maximum offset of a conditional jump to the program counter plus the maximum offset of the conditional jump;

wherein a cache controller determining, in response to a jump command received from the processor, if a target address is stored in the cache; and the cache controller delaying fetching additional instructions from the NAND flash if the jump command is a backward jump command and the address is stored in the cache.

10. The method of claim 9, further comprising executing the sequential program.

11. A method of claim 9, further comprising:

determining, in response to the jump command received from the processor, if the target address is stored in the cache; and if the target address is stored in the cache, changing the program to the target address; and if the target address is not stored in the cache, clearing the cache and send the target address to the NAND flash.

12. The method of claim 11, further comprising sequentially fetching additional instructions from the NAND flash if the jump command is a forward jump command and the address is stored in the cache.

13. The method of claim 9, wherein the cache has a minimum size twice the maximum offset of a conditional jump.

14. The method of claim 9, wherein the cache has a size equal to twice the maximum offset of a conditional jump.

* * * * *